United States Patent
Zhu et al.

(10) Patent No.: US 9,330,688 B1
(45) Date of Patent: May 3, 2016

(54) PROCEDURE THAT ACHIEVES A TARGET AREAL DENSITY FOR A HEAT-ASSISTED RECORDING MEDIUM

(71) Applicant: Seagate Technology LLC, Cupertino, CA (US)

(72) Inventors: Wenzhong Zhu, Apple Valley, MN (US); Kaizhong Gao, North Oaks, MN (US); Michael A. Cordle, Eagan, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/666,557

(22) Filed: Mar. 24, 2015

Related U.S. Application Data

(60) Provisional application No. 62/081,790, filed on Nov. 19, 2014.

(51) Int. Cl.
| | | |
|---|---|---|
| *G11B 5/00* | (2006.01) | |
| *G11B 5/09* | (2006.01) | |
| *G11B 5/012* | (2006.01) | |
| G11B 20/12 | (2006.01) | |
| G11B 20/10 | (2006.01) | |

(52) U.S. Cl.
CPC ........ *G11B 5/09* (2013.01); *G11B 5/012* (2013.01); *G11B 20/10305* (2013.01); *G11B 20/10388* (2013.01); *G11B 2005/0021* (2013.01); *G11B 2020/1292* (2013.01); *G11B 2020/1298* (2013.01)

(58) Field of Classification Search
None
See application file for complete search history.

(56) References Cited

U.S. PATENT DOCUMENTS

| | | | |
|---|---|---|---|
| 6,957,379 B1 * | 10/2005 | Patapoutian et al. | ........... 360/31 |
| 7,102,838 B2 | 9/2006 | Kim et al. | |
| 8,797,672 B2 | 8/2014 | Tanabe et al. | |
| 8,854,929 B1 | 10/2014 | Champion et al. | |
| 2011/0205861 A1 * | 8/2011 | Erden et al. | ........ 369/13.27 |

* cited by examiner

*Primary Examiner* — Brian Butcher
(74) *Attorney, Agent, or Firm* — Hollingsworth Davis, LLC

(57) ABSTRACT

A recording head writes data to a recording medium for one or more iterations. Each iteration involves adjusting a linear data density, a track pitch, and a laser power. From the iterations, a selected linear data density, a selected track pitch, and a selected laser power are determined that together achieve a target areal density and are used to write user data to the recording medium during operation of a hard disk drive.

19 Claims, 12 Drawing Sheets

PROCEDURE THAT ACHIEVES A TARGET AREAL DENSITY FOR A HEAT-ASSISTED RECORDING MEDIUM

RELATED PATENT DOCUMENTS

This application claims the benefit of Provisional Patent Application Ser. No. 62/081,790 filed on Nov. 19, 2014, to which priority is claimed pursuant to 35 U.S.C. §119(e), and which is incorporated herein by reference in its entirety.

SUMMARY

The present disclosure is directed to a method and apparatus used to achieve a target areal density for a heat assisted recording medium. In one embodiment, a recording head writes data to a recording medium for one or more iterations. Each iteration involves adjusting a linear data density, a track pitch, and a laser power. From the iterations, a selected linear data density, a selected track pitch, and a selected laser power are determined that together achieve a target areal density and are used to write user data to the recording medium during operation of a hard disk drive.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to optimizing areal density in devices that use heat-assisted media recording (HAMR). This technology, also referred to as energy-assisted media recording (EAMR), thermally-assisted media recording (TAMR), and thermally-assisted recording (TAR), uses an energy source such as a laser to heat a small spot on a recording medium (e.g., magnetic disk) during recording. The heat lowers magnetic coercivity at the hot spot, allowing a write transducer to change magnetic orientation. Due to the relatively high coercivity of the recording medium after cooling, the data is less susceptible to paramagnetic effects that can lead to data errors.

The areal density of data written on the recording medium is a function of the track width (tracks-per-inch) and the linear bit density along each track (bits-per-inch). These two parameters may be affected by a number of design choices, including the size of the hot spot and the strength/extent of the magnetic field of the write transducer. For example, if the hot spot can be made much smaller than the extent of the magnetic field, then the hot spot can be used to controls the minimum size of the recorded bit. This is because the medium has high enough magnetic coercivity that parts of the magnetic field that are applied to regions outside the hot spot are not affected by the field.

During qualification of a HAMR disk drive, the laser is calibrated along with other parts of the read/write head to ensure it provides a hot spot within a defined tolerance. One way of calibrating the laser power is to set a fixed track pitch and, during calibration, set write parameters of each individual read write/head to write at that width. While this approach ensures that the tracks are not being written too wide or too narrow, it may not always optimize for best head performance. Another approach is to set a custom areal density that is optimized for a particular set of components. This could be done by performing iterative sweeps of bits-per-inch (BPI) and tracks-per-inch (TPI) settings and re-calibrate the laser at each step. However, such an approach may take a long amount of time to complete and/or add significant unnecessary stress to the read/write head.

The present disclosure describes a way of providing optimal areal density by optimizing laser power for a given disk drive. Areal density is optimized using a target bit error rate (BER) instead of a target track pitch. This procedure can be performed relatively quickly and without significant wear on the read write/head. Thereafter, the drive uses TPI and BPI settings that are optimized for its own particular operating characteristics.

Figure 1:
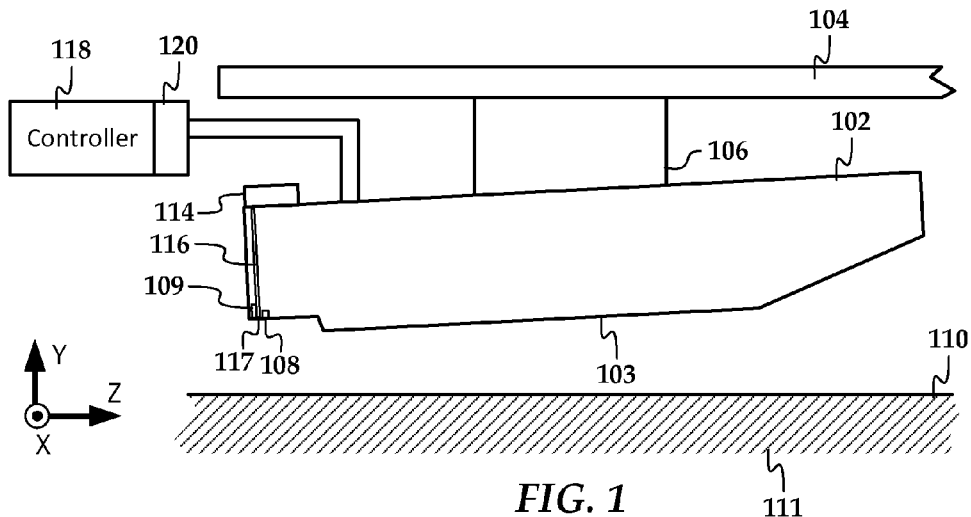
FIG. 1 is a block diagram of a hard drive slider and media arrangement according to an example embodiment.

In reference now to FIG. 1, a block diagram shows a side view of a read/write head 102 according to an example embodiment. The read/write head 102 may be used in a HAMR data storage device, e.g., HAMR magnetic hard disk drive (HDD). The read/write head 102 may also be referred to herein as a slider, read head, recording head, etc. The read/write head 102 is coupled to an arm 104 by way of a suspension 106, e.g., a gimbal. The read/write head 102 includes read/write transducers 108, 109 at a trailing edge that are held proximate to a surface 110 of a magnetic recording medium 111, e.g., magnetic disk. When the read/write head 102 is located over surface 110 of recording medium 111, a flying height is maintained between the read/write head 102 and the surface 110 by a downward force of arm 104. This downward force is counterbalanced by an air cushion that exists between the surface 110 and an ABS 103 (also referred to herein as a "media-facing surface") of the read/write head 102 when the recording medium 111 is rotating.

The read/write head 102 includes a laser 114 coupled to an optical path 116 integrated into the read/write head 102. The optical path 116 includes a near-field transducer 117 near the write transducer 109. The near-field transducer 117 achieves surface plasmon resonance in response to the optical energy, and directs the surface plasmons to heat a surface of the recording medium 111. A controller 118 includes logic circuits that control current supplied to the laser 114, as well controlling the as sending and receiving of signals to and from the recording head. Those signals include read and write channel data, adaptive fly height control signals, etc. An interface 120 conditions the signals between the controller 118 and the read/write head, e.g., amplification, filtering, analog-to-digital conversion, digital-to-analog conversion, etc.

Figure 2:
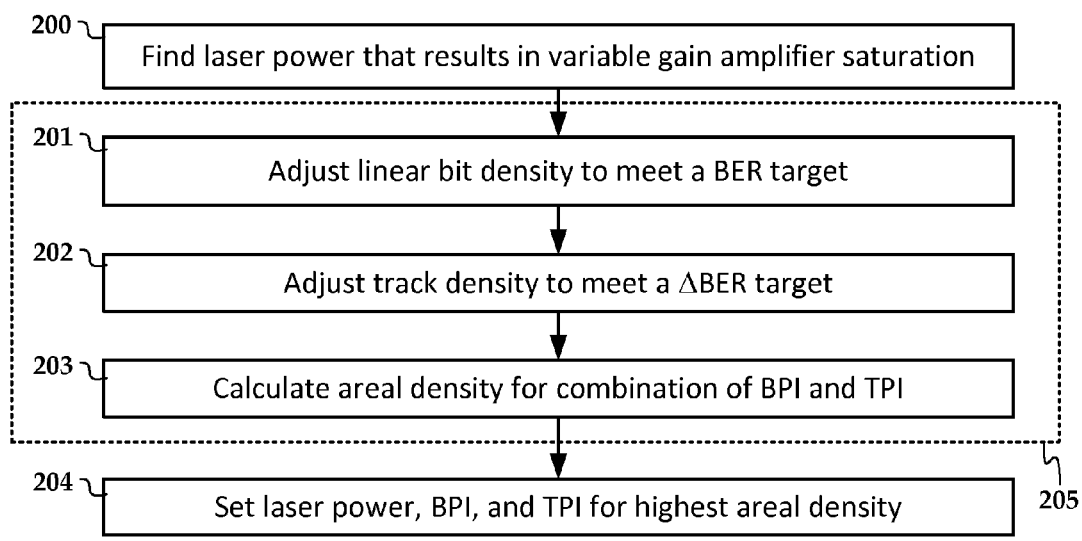
FIG. 2 is a flowchart summarizing an areal density optimization procedure according to an example embodiment.

In reference now to FIG. 2, a flowchart summarizes an areal density optimization procedure according to an example embodiment. The procedure first involves finding 200 a laser power that results in saturation of a variable gain amplifier (VGA) that reads back a signal recorded at various laser power levels. This laser power is incrementally increased for multiple invocations of steps 201-203. For each laser power increment, data is recorded while adjusting 201 linear bit density (BPI) settings until a BER target value is met. Similarly, a track density (TPI) is adjusted 202 to meet a delta BER target for a given BPI and laser power increment. Areal density for the currently laser power, BPI and TPI is calculated. As indicated by the dashed lines, steps 201-203 may be considered a subroutine 205 that is iterated through multiple times, and allows for calculating 203 an areal density for a range of laser power, BPI, and TPI combinations. The resulting data allows laser power, BPI, and TPI to be set 204 to a value that results in the highest areal density (or some other target areal density).

Figure 3:
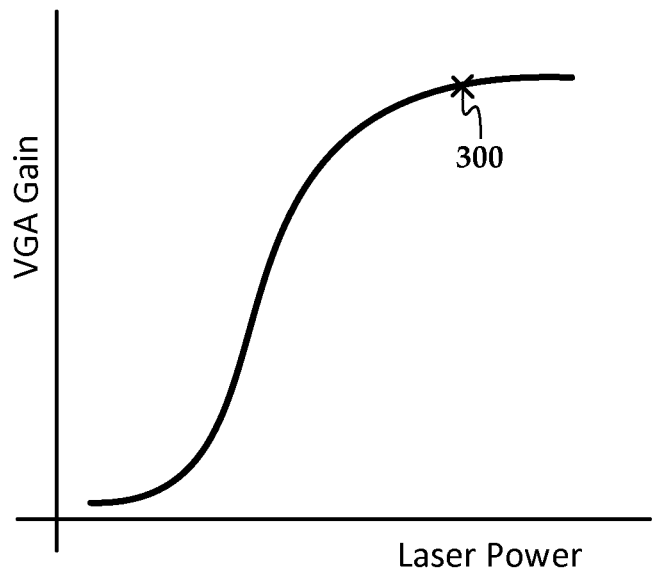
FIG. 3 is a graph showing an example plot of laser power versus variable gain amplifier gain used during the optimization procedure.

In FIG. 3, a graph shows an example plot of laser power versus variable gain amplifier (VGA) gain used during the VGA saturation step 200 of FIG. 2. Generally, the VGA is a component of the read channel. The VGA gain provides a measure of strength/magnitude of data that was previously written to a track. The on-track VGA gain is tracked while performing an increasing sweep of laser power. Point 300 represents a starting laser power where the VGA gain begins to saturate. This is a lowest possible laser power setting that can be used in the rest of the procedure, which ensures the media is at least reaching saturation magnetization. This step 200 is different from measuring the cross-track VGA profile in that VGA gain is not being referenced back to a baseline signal level.

The laser power value indicated by point 300 in FIG. 3 serves as a starting point for steps 201-203 in FIG. 2. Steps 201 and 202 involve an increasing sweep of laser power. A BPI and TPI capability are determined for each laser power. The BPI and TPI settings associated with a particular laser power may be referred to herein as BPIc and TPIc. The determination of BPIc and TPIc at different laser powers facilitates calculating the maximum areal density capability at each laser power setting (the areal density referred to as ADc) at step 203 and choosing the laser power with the highest areal density. Starting from the laser power at VGA saturation shown as point 300 in FIG. 3, steps 201-203 are performed. Then laser power is increased by 1 DAC and steps 201-203 are repeated at this laser power setting. Then laser power is increased again by 1 DAC, steps 201-203 repeated again, and so on. This continues until the laser power with the highest areal density capability is found.

Figure 4:
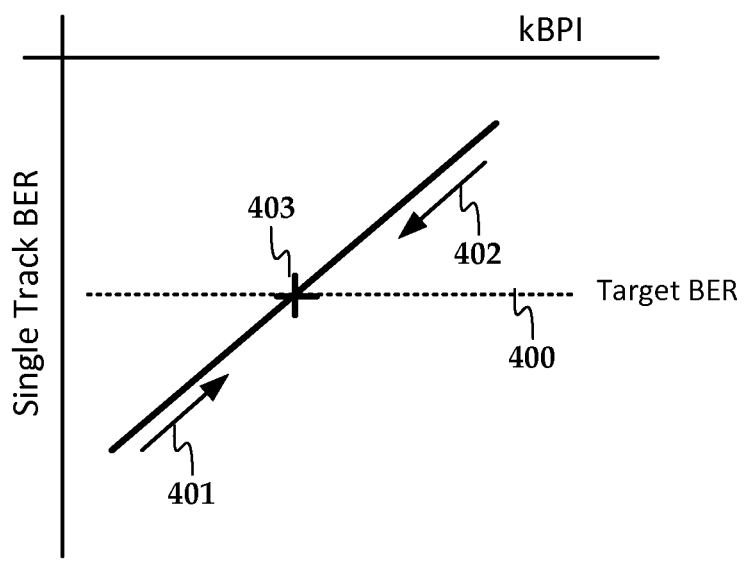
FIG. 4 is a graph showing an example of adjusting linear bit density to meet a bit error rate target during the optimization procedure.

In FIG. 4, a graph shows an example of adjusting BPI to meet a BER target 400 as described in step 201 of FIG. 2. A single track BER is first measured by recording and reading back an isolated track. If BER is less (better) than the target 400, BPI is increased as indicated by arrow 401 until the BER is greater (worse) than the target BER 400. If BER is greater (worse) than the target, BPI is decreases as indicated by arrow 402 until the BER is less (better) than the target error rate. The BPI at point 403 represents the last measurement where error rate was less (better) than the target 400. If the minimum BPI is reached without falling below the target 400, the BPI pick is NONE and the subroutine 205 continues with the next laser power setting.

Figure 5:
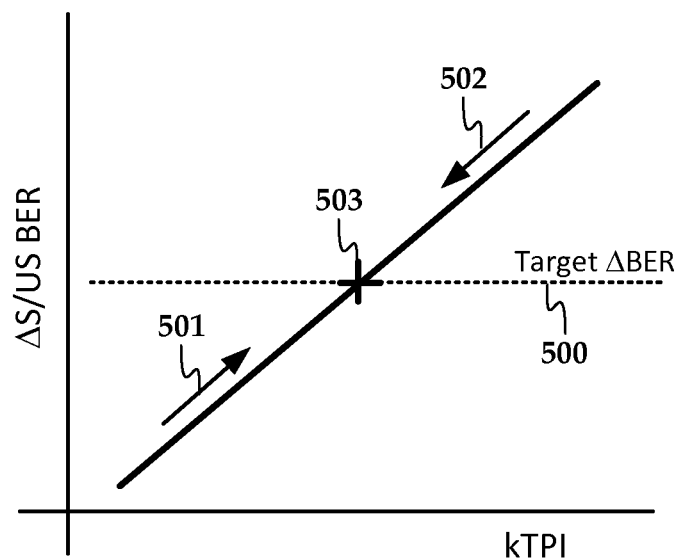
FIG. 5 is a graph showing an example of adjusting track pitch to meet a bit error rate target during the optimization procedure.

In FIG. 5, a graph shows an example of adjusting TPI to meet a ΔBER target 500 as described in step 202 of FIG. 2. The previous step 201 will determine a BPI that meets a target BER on a single track, and this step involves changing TPI and determining a delta between single track (un-squeezed) and squeezed error rates (error rate where track pitch is decreased so tracks are closer together). This may also be referred to herein as ΔS/US, which refers to a ΔBER of squeezed versus un-squeezed tracks. To perform this procedure, data is written over multiple tracks, and bit error rate is determined by reading back the recorded data over multiple (e.g., three) tracks. The resulting BER is expressed as an amount (ΔBER) of error rate decades that the squeezed measurement diverges from the single track BER from the previous step 201.

If ΔBER is less (better) than the target 500, TPI is increased as indicated by arrow 501 until ΔBER is greater (worse) than the target. If ΔBER is greater (worse) than the target, TPI is decreased as indicated by arrow 502 until ΔBER is less (better) than the target. Point 503 represents the desired value— the highest TPI where ΔBER is still less (better) than the target. If the minimum TPI is reached, the TPI pick is NONE and the subroutine 205 continues with the next laser power setting.

Figure 6:
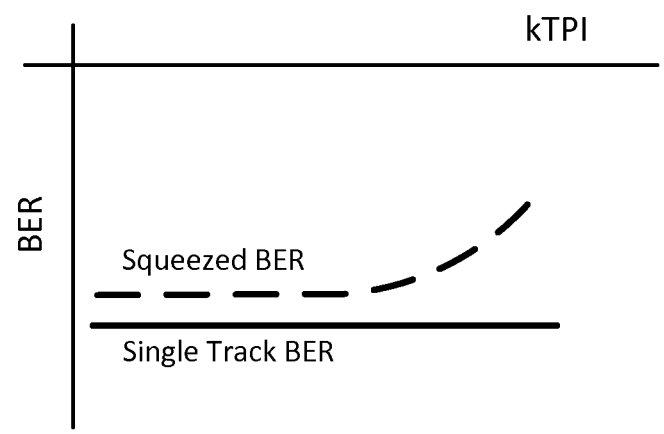
FIG. 6 is a graph showing divergence of single track bit error rate and squeezed bit error rate during the optimization procedure.

To measure delta BER, the single track and squeezed BER are measured at each TPI step. The TPI capability is found when the squeezed BER diverges from the single track BER by some amount, as shown in FIG. 6. To save test time, it may be possible to only measure squeezed BER at each step in TPI and reference back to the final single track BER from step 201.

Figure 7:
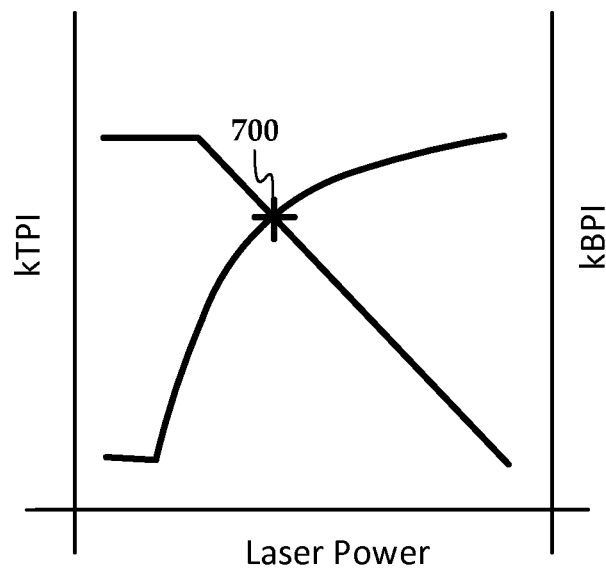
FIGS. 7 and 8 are graphs showing examples of choosing a laser power with the highest areal density during the optimization procedure.
Figure 8:
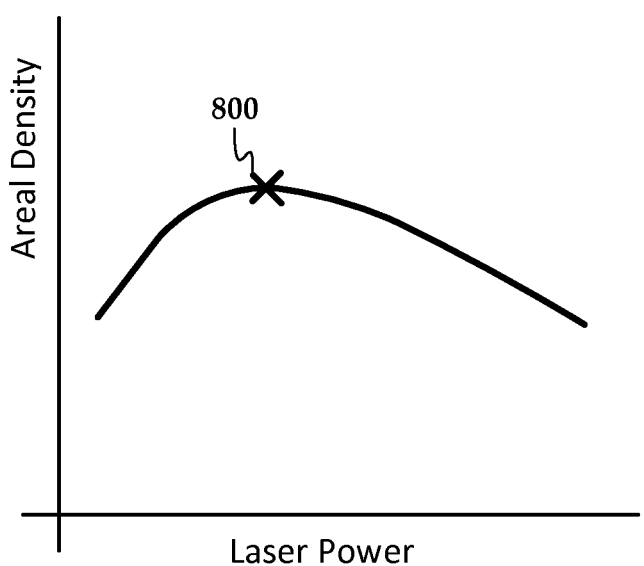

In FIG. 7, a graph shows an example of choosing the laser power with the highest areal density as described in step 203 of FIG. 2. Using the BPI and TPI picks from steps 201 and 202, areal density is calculated for the laser power as indicated by point 700. This areal density ADc is found for each iteration of the subroutine 205 of FIG. 2, the result being that relationship between areal density and laser power can be determined. This relationship is shown in the graph of FIG. 8. If the ADc vs. laser power curve begins to roll over as indicated by point 800, or if the upper limit for laser current has been reached, then this step of the procedure is complete.

One thing to note about this procedure is that after the first BPIc and TPIc measurements at the starting laser power, the starting BPI and TPI settings for all subsequent laser power settings ($LDI_n$) are fed forward from the previous laser power setting ($LDI_{n-1}$). This minimizes the number of BER measurements required to find the BPI and TPI at $LDI_n$ and significantly reduces the test time. It is also noted that that the laser power pick can only increase from the point of VGA saturation (step 200). The laser power sweep will stop at the point shortly after where the areal density curve rolls over (slope<=0). There is also a user-defined maximum laser power that will cause the drive to fail if reached. These two mechanisms provide a safeguard against over-driving the laser.

Figure 9:
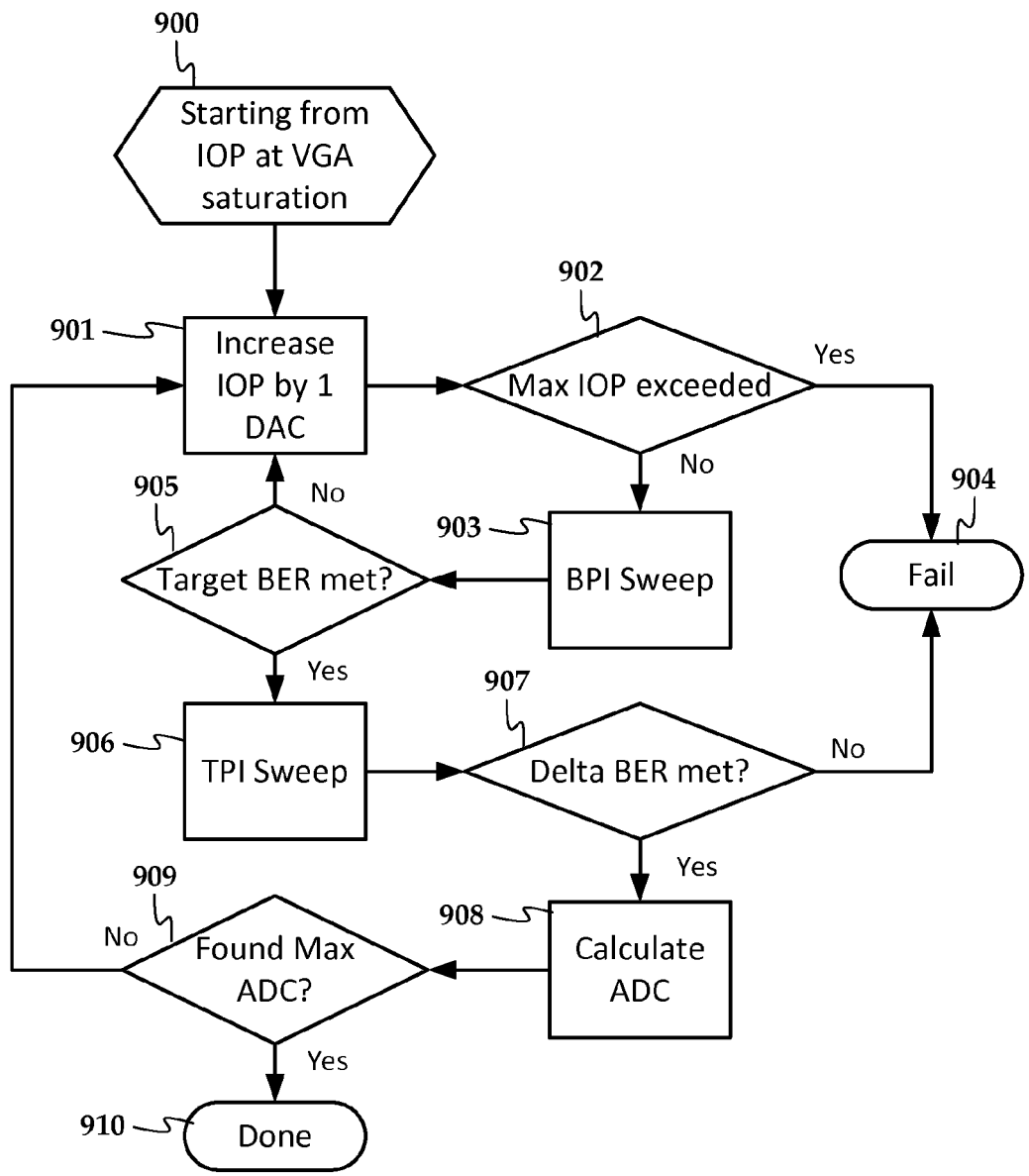
FIGS. 9, 10, and 11 are flowcharts showing details of an areal density optimization procedure according to an example embodiment.
Figure 10:
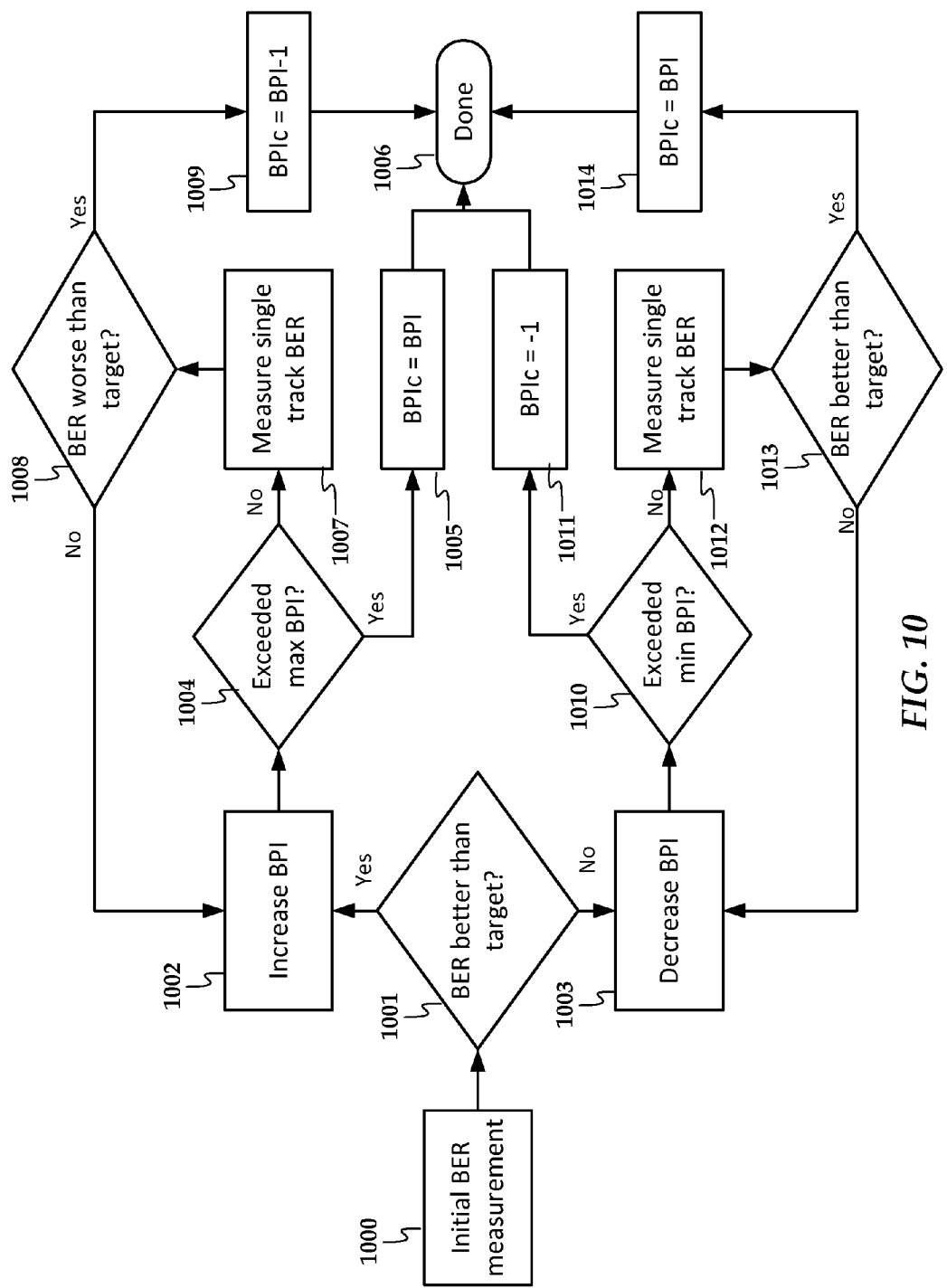

In FIG. 9, a flowchart shows details of the subroutine 205 of FIG. 2. The procedure begins with laser power (IOP) set 900 to VGA saturation from the previous step. At block 901, the DAC value that sets IOP is increased by one, and assuming maximum IOP is not exceeded at block 902, a BPI sweep 903 is performed. Details of the BPI sweep 903 are shown in FIG. 10. Operations 901-903 are repeated until maximum IOP is reached (in which case the device fails 904) or target BER is met as tested at block 905. The test 902 for maximum IOP is put in place to safeguard against over-driving the laser in the presence of code bugs or unexpected changes to the characteristics of head performance.

Figure 11:
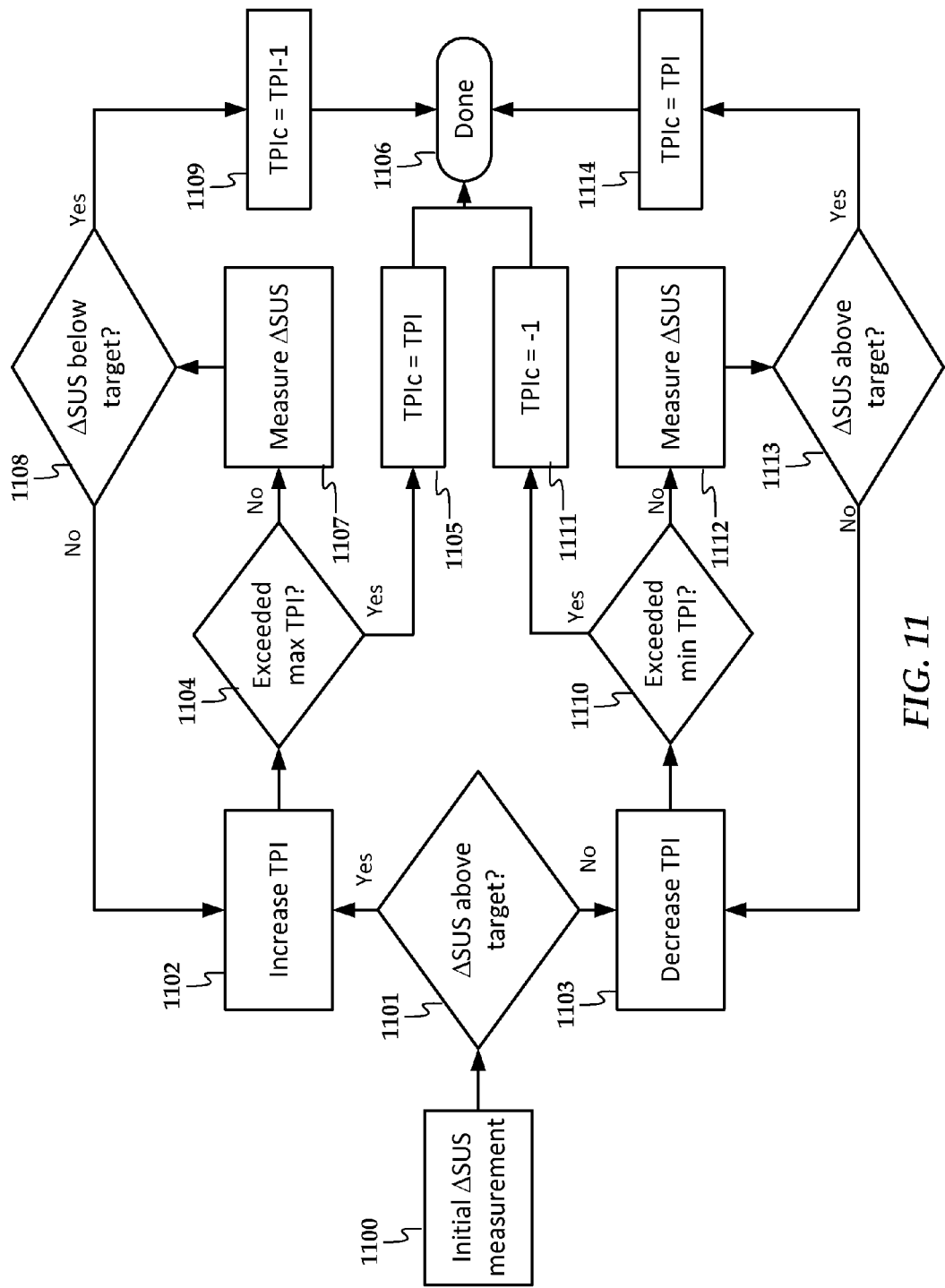

If the target BER is met, then a TPI sweep 906 is performed. Details of the TPI sweep 906 are shown in FIG. 11. If the result of the TPI sweep is that the delta BER tested at block 907 (ΔS/US) is not met (result is "no"), then the laser current has been increased too much to meet the squeezed BER requirement at the lowest possible TPI setting, and so the drive fails. Otherwise, if the delta BER tested at block 907 is met, the areal density (ADc) is calculated at block 908. Finally, the ADc found at block 908 is used to determine 909 if a maximum ADc is found, and if so, the procedure is complete 910. Determining the maximum ADc may take at least a few iterations to establish a trend, and so for the first few runs, test 909 may return 'no' regardless of what is calculated at block 908.

In FIG. 10, a flowchart shows details of the BPI sweep 903 of FIG. 9. The BPI sweep begins by taking an initial BER measurement 1000. If it is determined 1001 that the BER is better (lower) than a target value, the BPI is increased 1002, otherwise the BPI is decreased 1003. In the former case, it is determined 1004 whether the BPI exceeds (is more than) a maximum BPI value. If so, the return value BPIc is set 1005 to the current BPI value, and the sweep returns 1006. If the BPI does not exceed a maximum BPI value, single track BER is measured 1007 and compared 1008 to the target. If the BER is worse than the target (higher), the return value BPIc is set 1009 to the previous BPI value (BPI-1) and the sweep returns 1006. Otherwise, the BPI is increased 1002 again and the previous steps repeat until either maximum BPI is exceeded or BER is worse than target.

If BPI is decreased 1003, then it is determined 1010 whether the BPI exceeds (is less than) a minimum BPI value. If so, the return value BPIc is set 1005 to an error code (e.g., −1), and the sweep returns 1006. This indicates that the device cannot meet minimum BPI requirements at least at this laser setting. If the BPI does not exceed the minimum BPI value, single track BER is measured 1012 and compared 1013 to the target. If the BER is better than the target, the return value is set 1014 to the current BPI value and the sweep returns 1006. Otherwise, the BPI is decreased 1003 again and the previous steps repeat until either minimum BPI is exceeded or BER is better than target. In this case, the minimum and maximum BPI are defined to prevent exceeding the capability of the read/write channel.

In FIG. 11, a flowchart shows details of the TPI sweep 906 of FIG. 9. The TPI sweep begins by taking an initial ΔS/US measurement 1100. If it is determined 1101 that the ΔS/US is above a target value, the TPI is increased 1102, otherwise the TPI is decreased 1103. In the former case, it is determined 1104 whether the TPI exceeds (is more than) a maximum TPI value. If so, the return value TPIc is set 1105 to the current TPI value, and the sweep returns 1106. If the TPI does not exceed a maximum TPI value, ΔSUS is measured 1107 and compared 1108 to the target. If the ΔS/US is below the target, the return value is set 1109 to the previous TPI value (TPI-1) and the sweep returns 1106. Otherwise, the TPI is increased 1102 again and the previous steps repeat until either maximum TPI is exceeded or ΔSUS is below the target.

If TPI is decreased 1103, then it is determined 1110 whether the TPI exceeds (is less than) a minimum TPI value. If so, the return value TPIc is set 1111 to an error code (e.g., −1), and the sweep returns 1106. This indicates that the device cannot meet minimum TPI requirements at least at this laser setting. If the TPI does not exceed the minimum TPI value, ΔS/US is measured 1112 and compared 1113 to the target. If the BER is above the target, the return value is set 1114 to the current TPI value and the sweep returns 1106. Otherwise, the TPI is decreased 1103 again and the previous steps repeat until either minimum TPI is exceeded or BER is better than target. In this case, the minimum and maximum TPI are defined to prevent exceeding the capability of the servo system.

Figure 12:
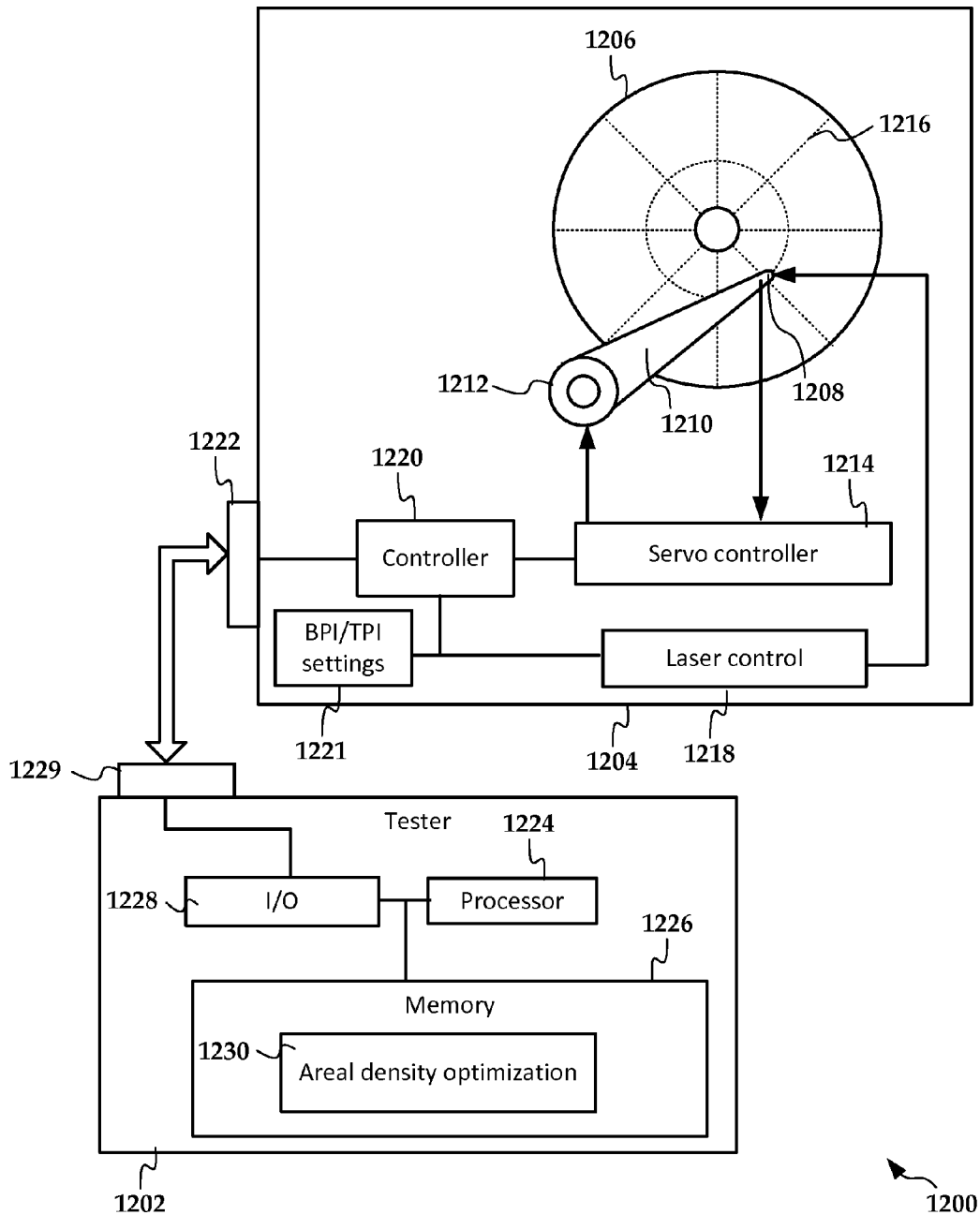
FIG. 12 is a block diagram of a testing system according to an example embodiment.

In reference now to FIG. 12, block diagram illustrates components of a testing system 1200 according to an example embodiment. The system 1200 includes a testing apparatus 1202 and tested hard disk drive device 1204. The hard drive 1204 includes a magnetic disk 1206 used as a recording media. A HAMR read/write head 1208 is mounted to an arm 1210 that is driven radially via a voice coil motor 1212 and optionally via a microactuator (not shown). A servo controller 1214 reads servo marks 1216 on the disk 1206 via the read/write head 1208. The servo marks 1216 facilitating locating where (e.g., which track) the read/write head 1208 is located.

A laser controller 1218 provides signals to an energy source (e.g., laser diode) of the read/write head 1208. The energy source heats the magnetic disk 1206 during write operations in response to the signals. The laser controller 1218 may obtain feedback from sensors located on the read/write head 1208 or elsewhere, such as photodiodes, thermal sensors. A controller 1220 provides high-level control of operations of the hard drive device 1204, including laser control and servo control. The controller 1220 may facilitate operations of other components not shown, such as read/write channels, disk motor control, power distribution, etc.

The hard drive device 1204 includes a host interface 1222 for communicating with external devices, including the tester apparatus 1202. The tester apparatus 1202 may include conventional computing hardware, such as a processor 1224, memory 1226, and input/output (I/O) circuitry 1228. The tester includes an interface 1229 that may provide electrical and mechanical coupling to the hard drive device 1204. The tester 1202 is at least configured (e.g., via instructions stored in memory 1226) to perform calibration and/or qualification tests on the hard drive device 1204. The instructions include an areal density optimization module 1230 that is configured to perform determination of BPI and TPI settings as described herein.

The areal density optimization module 1230 may send commands via the hard drive device's host interface 1222 or other I/O interface. These instructions cause the hard drive device 1204 to perform an optimization during qualification testing. The optimization involves incrementing a laser power applied to the recording head 1208 to record data to the heat-assisted recording medium 1206 for one or more iterations. Each iteration involves, at each laser power: 1) adjusting a linear data density (BPI) of first data written to a single track of the recording medium to achieve a first bit error rate; and 2) adjusting a track pitch (TPI) of second data written to multiple tracks of the recording medium 1206 to achieve a second bit error rate.

Based on the iterations, a selected linear data density, a selected track pitch, and a selected laser power are determined that together achieve a target areal density. Thereafter, the selected linear data density, the selected track pitch, and the selected laser power to are used to write user data to the recording medium 1206. For example, the controller 1220 of the hard drive device 1204 may store the selected values in a memory 1221 (e.g., system register) and these may be referenced (e.g., via the servo controller 1214) during reading and writing operation of the device 1204.

Figure 13:
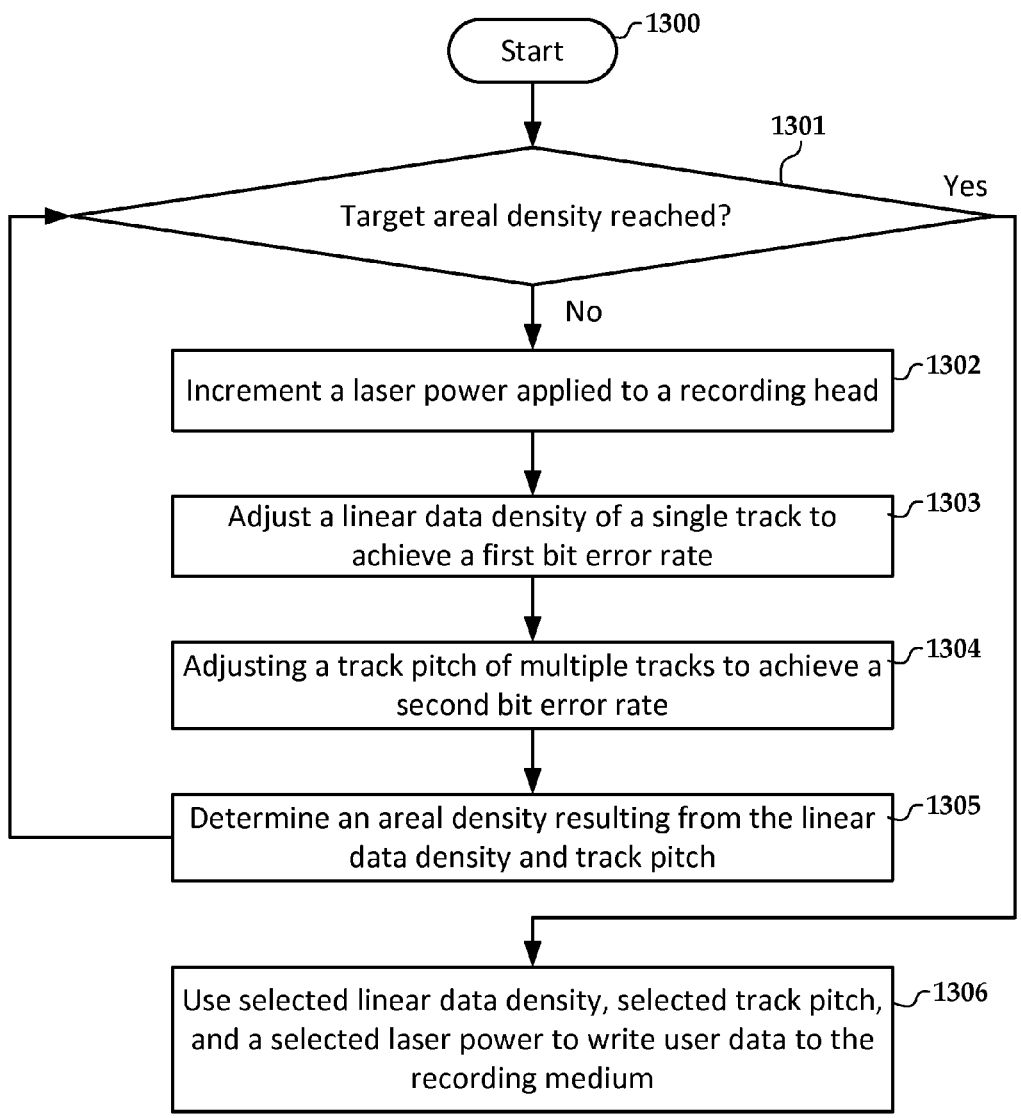
FIGS. 13 and 14 are flowcharts methods according to example embodiments.

In FIG. 13, a flowchart illustrates a method according to an example embodiment. The method starts 1300 by determining 1301 if a target areal density is reached, e.g., a maximum (local or global), optimum, or other target value. The starting may include additional operations (not shown) such as setting an initial laser power to VGA saturation. Upon starting, and for a few iterations thereafter, it may be assumed in some cases (e.g., where the target is a maximum) that the target will not be reached until enough data has been collected, and so in those cases the determination 1301 will be negative. In other situations, e.g., where the target areal density is a predetermined (e.g., floor) value, it may be possible that zero or one iterations are performed.

If it is determined 1301 that the target is not yet reached, an iteration involving blocks 1302-1305 is performed. A laser power (applied to a recording head to record data to a heat-assisted recording medium) is incremented 1302 for each of the iterations. At the current laser power, a linear data density of first data written to a single track of the recording medium is adjusted 1303 to achieve a first bit error rate. Also at this laser power, a track pitch of second data written to multiple tracks of the recording medium is adjusted to achieve a second bit error rate, which may be expressed as a delta from the first error rate. A areal density resulting from the linear data density and track pitch is determined. When the target areal density is reached, the selected linear data density, the selected track pitch, and the selected laser power are thereafter used to write user data to the recording medium.

In the previous examples, a saturation laser power may first be found as part of the procedure (e.g., as shown in FIG. 3). Thereafter, iterations are performed where a BPI/TPI combination is found that meets a target BER (e.g., FIGS. 4-6), and areal density is found. The laser power is steadily increased for subsequent iterations until a maximum areal density is found for the iteration (e.g., FIG. 7) and laser power for this iteration is recorded. The laser power of all the iterations that exhibit the highest areal density is then selected (e.g., FIG. 8).

In alternate embodiments, a default laser power may be chosen at the start instead of testing for a saturation point. For example, a nominal value of current known to be at or near a saturation point for a class of laser devices may be used as a default laser power starting point. As before, a BPI/TPI combination can be found that satisfy a BER threshold (referred to as BPIc and TPIc), and areal density (ADc) of this BPIc/TPIc combination can be found. Then laser power is reduced, and BPIc/TPIc are found as the previous iteration, and ADc is found for this next combination. This repeats by either increasing or decreasing laser power until ADc hits a peak value, then the smallest laser power (along with associated BPI and TPI) may be chosen that satisfies ADc requirements. This embodiment can reduce the test time by avoiding multi-dimension sweeping to determine settings. The settings can be used to provide a target areal density and potentially increases the life of the laser and other optical components (e.g., the NFT), by using the lowest laser power needed to provide a target areal density.

Figure 14:
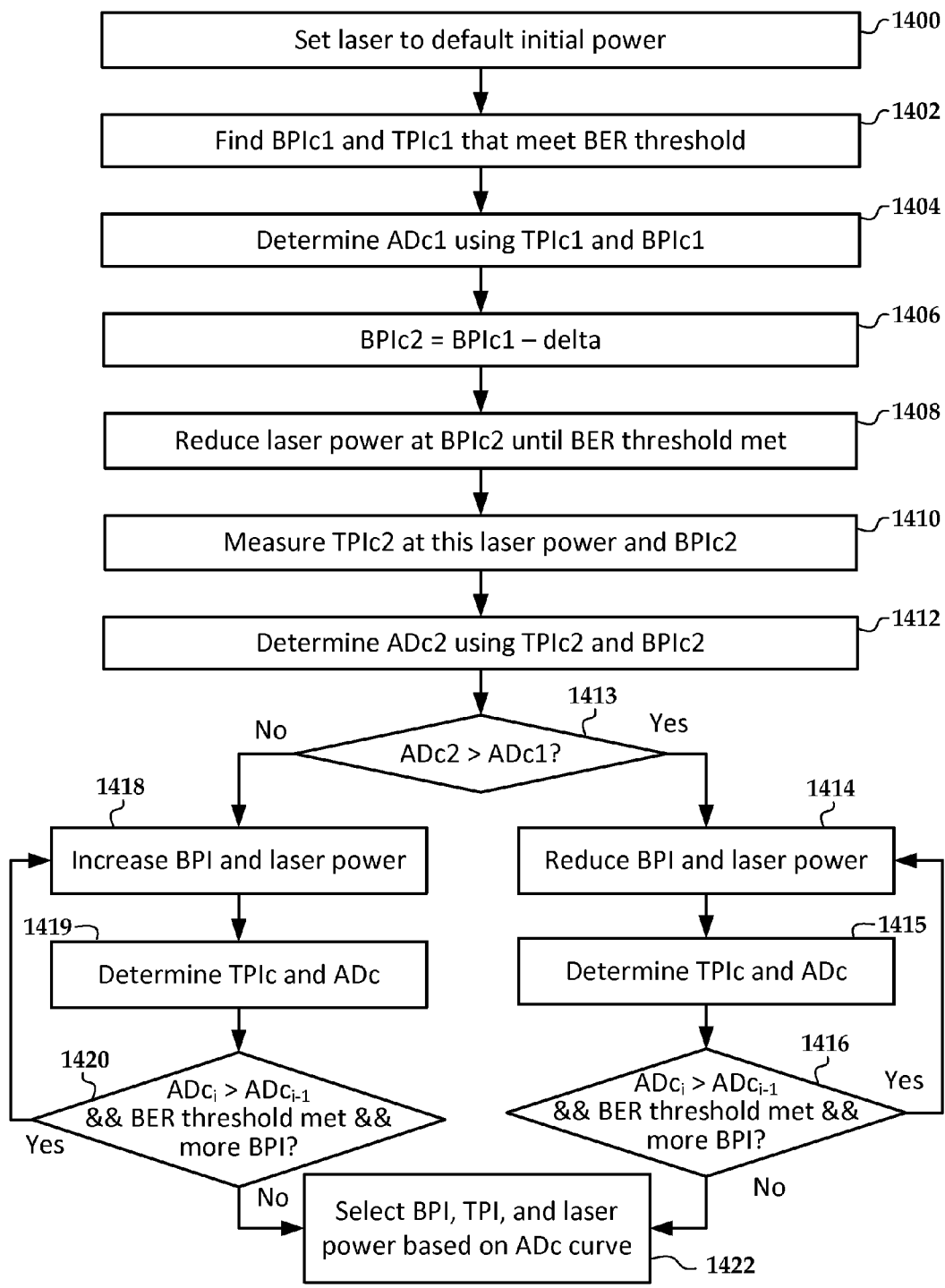
Figure 15:
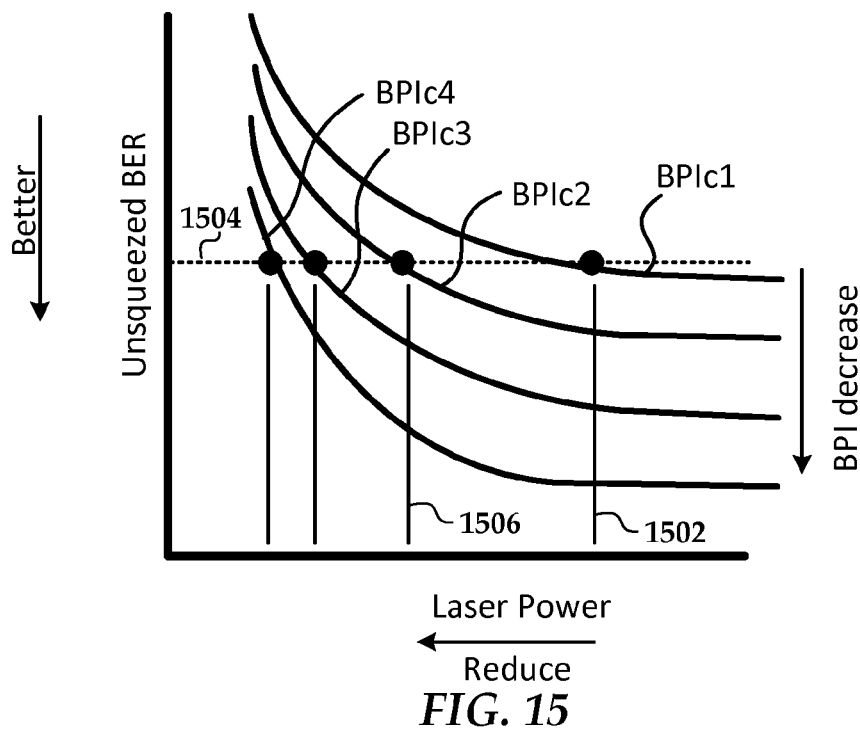
FIG. 15 is a graph showing linear data density curves as a function of laser power according to an example embodiment.

In FIG. 14 a flowchart illustrates a method according to another example embodiment. The laser power is set 1400 to an initial (e.g., default) amount as previously described. Data is written and read at this laser power to determine 1402 what is referred to in this example as BPIc1 and TPIc1, which are initial values of linear data density and track pitch, respectively. The BPIc in this case refers to a linear data density that achieves a target BER threshold at a "wide" (e.g., unsqueezed) track pitch at a given laser power. The TPIc designation refers to a minimum track pitch at an associated BPIc that achieves a different target BER threshold at the squeezed condition. The term ADc refers to an areal density at a given BPIc and TPIc. The value of ADc may be zone-specific, such that each radially-defined zone may have a different value of ADc. The graph of FIG. 15 shows BPIc values according to an example embodiment.

The curves BPIc1-BPIc4 in the graph illustrate the relationship between laser power versus unsqueezed BER for four different values of BPI. The laser power 1502 is the default laser power, and dashed line 1504 represents the target BER. As indicated by the relative placement of the curves BPIc1-BPIc4, lower BPI generally corresponds to lower BER, and also corresponds to lower laser power needed to achieve the target BER value 1504. The BPIc1 value shown in FIG. 15 is obtained as part of step 1402 in FIG. 14 using the default laser value 1502.

Referring again to step 1402 in FIG. 14, the initial value of track pitch, TPIc1, may found by determining encroachment and/or adjacent track interference (ATI) that exceed a threshold. Determining encroachment may involve writing tracks at ever decreasing track pitch using BPIc1 linear density until BER goes over a threshold. A threshold ATI may be found using delta BER value or final BER after multiple write cycles (e.g., single-side or double-sided multiple write). In one embodiment, determining TPIc involves reducing track pitch until a threshold encroachment is met, in which case the ATI is measured at this track pitch. If ATI meets a threshold, then this track pitch is used as TPIc, otherwise track pitch in increased until ATI meets the threshold.

Figure 16:
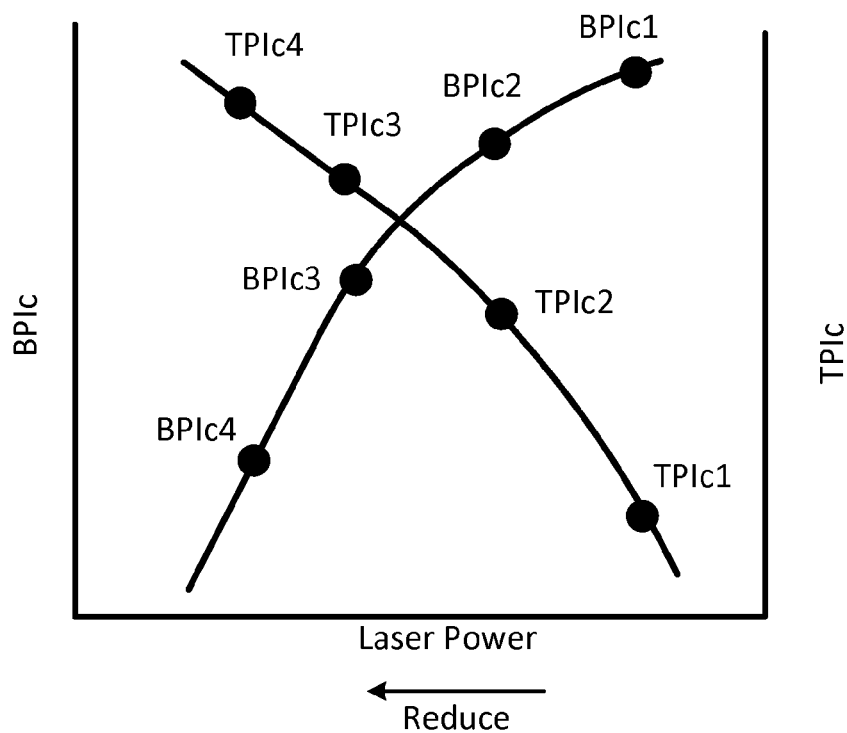
FIG. 16 is a graph showing a relationship between linear density and track pitch according to an example embodiment.

The BPIc1 and TPIc1 values are used to determine 1404 initial areal density ADc1. The value of ADc1, as well as other areal densities described below, may be different for each zone, and a maximum capacity for each zone may involve using different values of BPIc and TPIc. The capacity for the device is the sum of the ADC for each zone. After the initial areal density ADc1 1404 is found, a value of BPIc2 used for the next iteration of the procedure is found by decrementing BPIc1 by some amount. Because BPIc2 is lower than BPIc1, the threshold BER can be met at a lower laser power than the default power (compare laser power 1506 in FIG. 15 with default laser power 1502). So laser power is also reduced and BER is measured at linear density BPIc2 using the decremented values of laser power. At the new lower laser power setting, TPIc2 and ADc2 are determined at steps 1410 and 1412, similar as TPIc1 and ADc1 as described above. Because BPIc2 is lower than BPIc1, TPIc2 may be expected to go higher. In FIG. 16, a graph shows this relationship between TPIc and BPIc according to an example embodiment.

Figure 17:
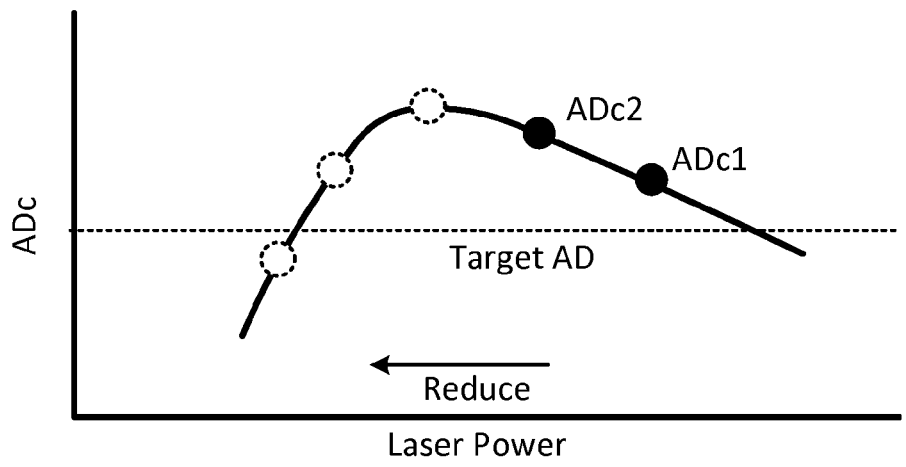
FIGS. 17, 18, and 19 are graphs of areal density versus laser power according to example embodiments.

Now that areal density values ADc1 and ADc2 are known, a comparison 1413 between the two can be made. If ADc2 is larger than ADc1, then additional steps 1414-1416 are performed to find a local maximum ADc using reduced values of laser power and BPIc. This case is illustrated in FIG. 17, which is a graph of ADc versus laser power according to an example embodiment. In FIG. 17, the higher value of ADc2 was found at a lower laser power than relatively lower ADc1, and so a local maximum may be found by further reducing the laser power. As indicated by the dashed circles, additional measurements are made (corresponding to steps 1414 and 1415 in FIG. 14) until either a low limit of BPI is reached or a threshold BER is reached, as determined at block 1416.

Figure 18:
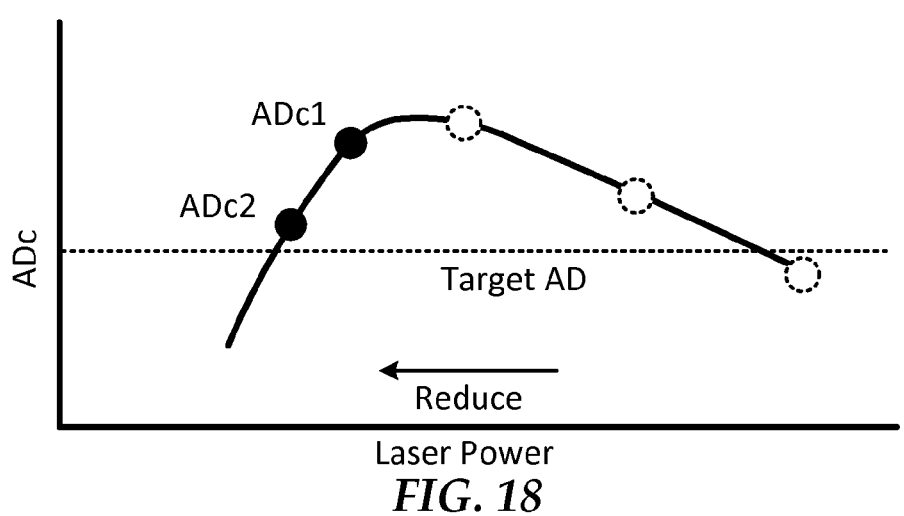

If it is determined at block 1413 that ADc2 is less than ADc1, then additional steps 1418-1420 are performed to find a local maximum ADc using increased values of laser power and BPIc. This case is illustrated in FIG. 18, which is a graph of ADc versus laser power according to another example embodiment. In FIG. 18, the lower value of ADc2 was found at a lower laser power than the relatively higher ADc1, and so a local maximum may be found by further increase the laser power. As indicated by the dashed circles, additional measurements are made (corresponding to steps 1418 and 1419 in FIG. 14) until either a high limit of BPI is reached or a threshold BER is reached, as determined at block 1420.

Figure 19:
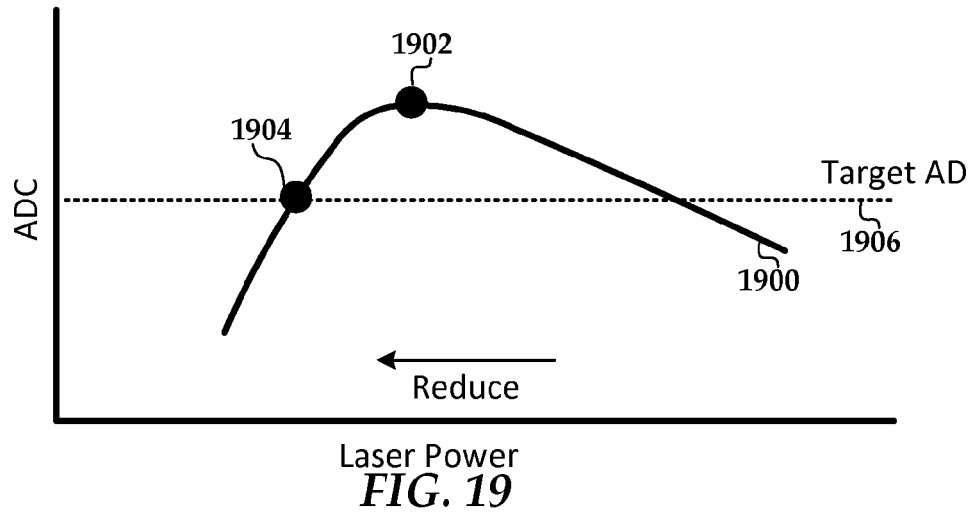

When either block 1416 or block 1420 return "no," then the data points from the iterations can be used to determine an ADc curve, such as indicated by curve 1900 in FIG. 19. The curve 1900 can be found, e.g., via a curve fit of ADc versus laser power in the previous steps. The curve 1900 can be used to select target values of BPI, TPI, and laser power, as indicated in block 1422 of FIG. 14. The curve 1900 can be plotted for each zone and/or for all zones of all disk surfaces in the case where a target total drive capacity is desired. In one embodiment, the selection 1422 chooses a maximum ADC value, as indicated by point 1902 in FIG. 19. The maximum value 1902 can be estimated, e.g., by performing a curve fit of the various ADc values and finding a local maximum within the indicated range. The BPI and TPI of this value 1902 can similarly be interpolated, e.g., using curves determined by fitting a BPI vs. laser power curve and a TPI vs. laser power curve using the discrete BPIc and TPIc data points. In another example, a tested laser power value close to that of point 1902 may be selected, and a combination of BPIc and TPIc associated with the selected laser power may be used.

In another example, block 1422 may select parameters using an ADc value that meets an AD threshold (e.g., AD that corresponds to a target capacity for a drive) at the lowest laser power. This is indicated by point 1904 in FIG. 19, which is the minimum laser power to reach the target AD 1906. This may involve finding maximum ADC for all zones, using a reduced value of laser power for all zones together, and then determining zone-specific BPIc and TPIc associated with the reduced laser power such that the resulting AD of all zones meets the target drive capacity. As with the previous example, an interpolation can be used to find laser power, TPI, and BPI of point 1904, or a tested set of laser power, TPIc, and BPIc close to point 1904 can be used. It will be understood that operation points with different ADc may be used. In some cases, the entire curve of ADc versus laser power may be below the target drive capacity 1906. In such a case the drive may be failed, or re-categorized with a lower advertised storage capacity.

It will be understood that many variations of the procedure shown in FIG. 14 are possible. For example, it may not be necessary to test every BPI until BPIc BER threshold can't be met anymore or no more BPI is available, as determined at blocks 1416 and 1420. The blocks 1416, 1420 may exit to block 1422 the ADc at the current BPIc is less than that the ADc at the previous BPIc. This corresponds to a data point in FIGS. 17 and 18 that are measured just after the peak of the curves. Further, if a laser power saturation test (see, e.g., step 200 in FIG. 2) is run before the procedure in FIG. 14 and set as the initial power at block 1400, then block 1413 may be unlikely to return "no."

In another variation, instead of decrementing 1406 BPIc then reducing 1408 laser power, the laser power could first be reduced and then continuously reduce BPI until the BER reaches $BPI_C$ threshold. This method may take more time to perform, however. Regarding the BER threshold used to find BPIc and/or TPIc, this threshold and the BER values can be obtained via fixed or dynamic soft output Viterbi algorithm (SOVA) or Sector Failure Rate, which generally corresponds with the signal-to-noise ratio of the read signal. The BER can be measured at nominal clearance or an elevated clearance to avoid vertical displace write (VDW) failure modes.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    determining an initial value of laser power based on incrementing the laser power while recording a signal to a heat-assisted recording medium, the initial value based on a power level that results in saturation when reading back the signal;
    recording data to the heat-assisted recording medium for two or more iterations, each iteration involving the adjustment of, in any order, linear data density, track pitch, and the laser power when writing data to a single track of the recording medium to achieve a target bit error rate for each iteration;
    determining, from the iterations, a selected linear data density, a selected track pitch, and a selected laser power that together achieve a target areal density; and
    using the selected linear data density, the selected track pitch, and the selected laser power to write user data to the recording medium.

2. The method of claim 1, wherein each iteration comprises:
    changing the laser power;
    adjusting the linear data density of first data written to a single track of the recording medium at the laser power to achieve a first bit error rate; and
    adjusting a track pitch of second data written to multiple tracks of the recording medium at the laser power and the linear data density to achieve the target bit error rate.

3. The method of claim 1, wherein each iteration comprises:
    changing the linear data density;
    adjusting a laser power of first data written to a single track of the recording medium at the linear data density to achieve a first bit error rate; and
    adjusting a track pitch of the second data written to multiple tracks of the recording medium at the laser power and the linear data density to achieve the target bit error rate.

4. A method comprising:
incrementing a laser power applied to a recording head to record data to a heat-assisted recording medium for one or more iterations, each iteration comprising, via the recording head at each laser power increment: adjusting a linear data density of first data written to a single track of the recording medium to achieve a first bit error rate; and adjusting a track pitch of second data written to multiple tracks of the recording medium to achieve a second bit error rate;
determining, from the iterations, a selected linear data density, a selected track pitch, and a selected laser power that together achieve a target areal density; and
using the selected linear data density, the selected track pitch, and the selected laser power to write user data to the recording medium during operation of a hard disk drive that comprises the recording head and the recording medium.

5. The method of claim 4, wherein the target areal density is a maximum areal density for all values of the linear data density, the track pitch, and the laser power.

6. The method of claim 4, wherein an initial value of the laser power is determined based on incrementing the laser power while recording a signal to the recording medium, and determining the initial value based on a power level that results in saturation when reading back the signal.

7. The method of claim 4, wherein the second bit error rate comprises a delta value of the first bit error rate.

8. The method of claim 7, wherein the delta value comprises a target delta value, and wherein adjusting the track pitch comprises increasing the track pitch if a measured delta value is less than the target delta value and decreasing the track pitch if the measured delta value is more than the target delta value.

9. The method of claim 4, wherein the first bit error rate comprises a target bit error rate, and wherein adjusting the linear data density comprises increasing the linear data density if a measured bit error rate is less than the target bit error rate and decreasing the linear data density if the measured bit error rate is more than the target bit error rate.

10. The method of claim 4, further comprising, determining that incrementing the laser power results in exceeding a maximum laser power and, in response thereto, failing the hard disk drive.

11. The method of claim 4, further comprising, determining during the iterations that at least one of the linear data density and the track pitch fall below a minimum value and, in response thereto, failing the hard disk drive.

12. A method comprising:
finding a linear data density, a track pitch, and a laser power for initially writing to a heat-assisted recording medium at an initial areal density;
for one or more iterations:
adjusting the linear data density;
determining an adjusted laser power at the adjusted linear data density to achieve a target bit error rate;
determining an adjusted track pitch at the adjusted linear data density and the adjusted laser power; and
determining an areal density using the adjusted linear data density, the adjusted laser power, and the adjusted track pitch;
finding, based on the iterations, a local maximum areal density and a selected linear data density, a selected laser power, and a selected track pitch associated therewith.

13. The method of claim 12, wherein adjusting the linear data density for a first of the iterations comprises decreasing the linear data density, and wherein the adjusting the laser power for the first iteration comprises decreasing the laser power.

14. The method of claim 13, wherein, if the areal density of first iteration is greater than the initial areal density, adjusting of the linear data density for subsequent iterations comprises decreasing the linear data density, and adjusting of the laser power for the subsequent iteration comprises decreasing the laser power.

15. The method of claim 13, wherein, if the areal density of first iteration is less than the initial areal density, adjusting of the linear data density for subsequent iterations comprises increasing the linear data density, and adjusting of the laser power for the subsequent iteration comprises decreasing the laser power.

16. The method of claim 12, further comprising, if the local maximum areal density is greater than a target areal density, finding, based on the iterations, a second linear data density, a second laser power, and a second track pitch such that an associated second areal density meets the target areal density, and wherein the second laser power is lower than the selected laser power.

17. The method of claim 12, wherein an initial value of the laser power is determined based on incrementing the laser power while recording a signal to the recording medium, and determining the initial value based on a power level that results in saturation when reading back the signal.

18. The method of claim 12, wherein determining the adjusted track pitch comprises decreasing track pitch until a threshold measure of track encroachment is detected.

19. The method of claim 12, wherein determining the adjusted track pitch comprises decreasing track pitch until a threshold adjacent track interference is detected.

* * * * *